United States Patent Office 2,804,094
Patented Aug. 27, 1957

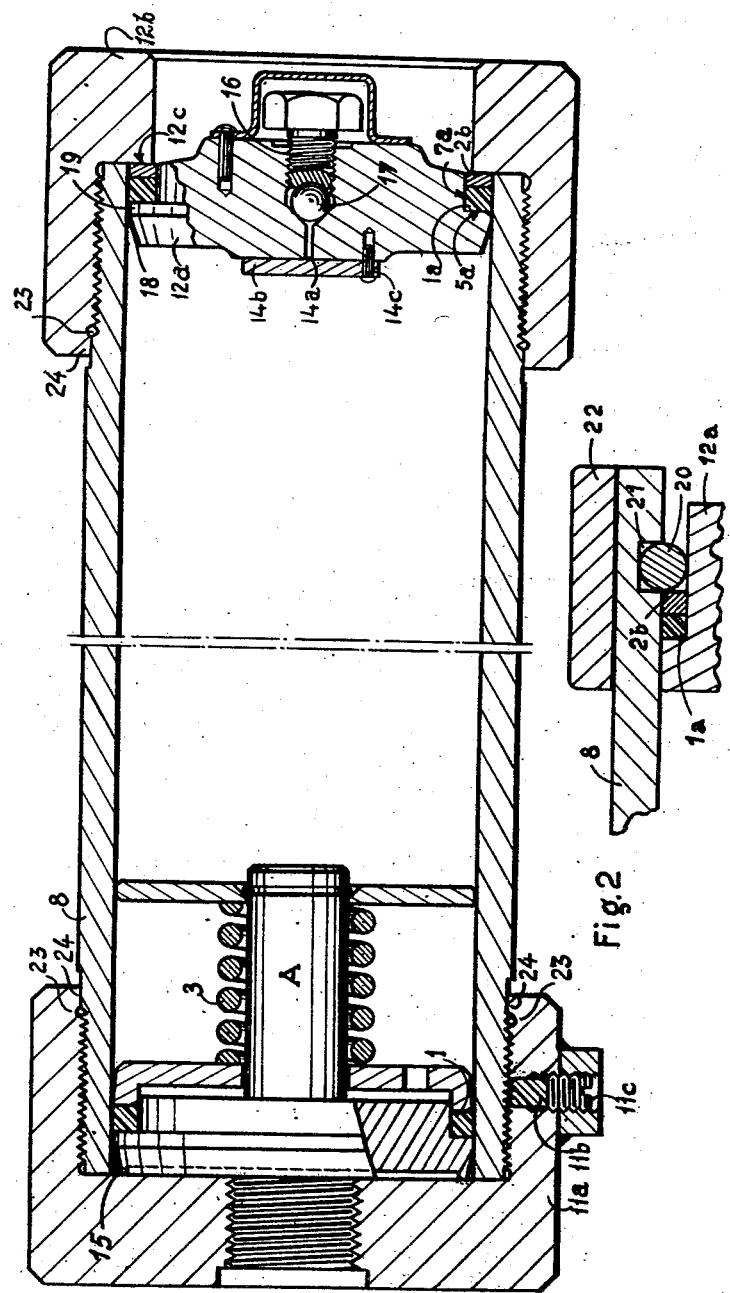

2,804,094

HYDROPNEUMATIC ACCUMULATORS

Jean Louis Gratzmuller, Paris, France

Application September 4, 1952, Serial No. 307,863

Claims priority, application France September 14, 1951

5 Claims. (Cl. 138—31)

The present invention relates to hydropneumatic and, more particularly, to oleopneumatic accumulators of the type in which the two fluids are separated by a gas-tight partition movable in a container of a generally cylindrical shape.

In this type of accumulators, one has to ensure a sealing of the gas chamber of variable volume in all circumstances, i. e., both when the gas occupies only a part of the volume of the container, while the liquid occupies the other part, and when the liquid is expelled from the container, for instance for storage, so that the entire volume of said container is occupied by the gas.

In fact, the quantity of compressed gas constituting the energy storing means should never be replaced, so that leakage of the gas must be entirely avoided.

The seal between the two fluids is obtained by a proper construction of the movable partition. This may take the form of a free piston constructed in the manner described and claimed in my patent application Ser. No. 247,226 filed September 19, 1951, for "Hydropneumatic Accumulator," now Patent No. 2,724,412, granted Nov. 22, 1951.

The present invention has for its object to obtain effective sealing between the gas chamber and the atmosphere.

According to my invention, the hydro-pneumatic accumulator comprises a gas-tight partition movable therein and serving to partition the interior of the body into gas-containing and liquid-containing chambers of variable volume depending on the disposition of the partition, pressure-tight means closing one end of the body and enclosing the liquid-containing chamber and having means of connection to a hydraulic system or apparatus, whereby liquid can enter the liquid-chamber of the accumulator, an inwardly facing annular abutment rigid with the body at or near the other end thereof, and a disc-shaped member freely slidable in the body and retained by said abutment which is engaged (through the intermediary of an annular packing and sealing ring, and a metallic washer, if desired) by the marginal part of said member, when the latter is subjected to internal gas-pressure, with a greater contact pressure than the internal gas pressure, said disc-shaped member having means, including a gas-tight non-return valve, for inflating the gas-chamber with gas under pressure.

Preferably, the annular area of the contact surface between the disc-shaped member and the annular abutment (through the packing ring, with or without washer, as described) is very small as compared with the area of the internal surface of said member, whereby the contact pressure between the margin of the disc-shaped member and the abutment, being equal to the internal gas-pressure multiplied by the ratio of the area of said internal surface to that of the annular abutment, is very high compared with the internal gas-pressure.

According to another feature of my invention, a packing element is interposed between said abutment and the marginal part of said disc-shaped element.

According to still another feature of my invention, the disc-shaped element comprises a cylindrical portion of reduced diameter, integral with the head and terminating at an annular shoulder, the packing element being constituted by a plastic or elastic sealing ring confined in the annular space defined by the cylinder wall, the cylindrical portion of reduced diameter, the annular shoulder and the annular abutment.

According to another feature of my invention, a metallic washer may be interposed between said plastic elastic sealing ring and said annular abutment. Such a washer can more easily be machined to precise prescribed dimensions than the abutment properly so-called.

According to still another feature of my invention, the sealing ring may be made of a plastic or elastic material such as neoprene, perbunan, silicones or polyamides.

These plastic materials have the remarkable property of undergoing continuous a slow plastic deformation under the action of a continuous compressive force, while responding elastically to suddenly applied forces, so that, when subjected to the action of a gas pressure, they ensure, in any conditions of use, a substantially perfect seal.

Thus, if the accumulator is subjected to very low temperatures capable of causing a contraction of the sealing ring, the gas pressure automatically re-establishes an effective seal. This has been confirmed by tests made at minus 80° C.

According to still another feature of my invention, the sealing ring may, alternatively, be made of a soft metal such as copper, or aluminum, such a ring being especially suitable when the pressures to be retained are very high.

According to still another feature of my invention applicable when the partition is constituted by a free piston, I provide, on the face of said free piston opposed to that on which gas pressure is exerted, an annular ridge of very small area compared to the area of the surface on which the gas pressure acts, said ridge being intended to bear against the head of the liquid containing end of the accumulator when emptied of liquid thus ensuring substantially absolute gas tightness in storage, under the effect of the gas pressure itself.

According to another feature of my invention, the non-return valve means through which compressed gas is introduced into the accumulator comprises a leaf or patch of plastic or elastic material covering an inflation aperture in the internal face of the slidable disc-shaped head element, to which said leaf or patch is attached at a plurality of points along its periphery, so that, during inflation, compressed gas can enter the accumulator, while, when the accumulator is inflated, said leaf or patch is held tightly against the inflation aperture by the gas pressure.

According to another feature of my invention, the abutment means for the slidable disc-shaped head element are constituted by a nut screwed on the threaded extremity of the tubular element. Said nut reinforces the extremity of the tubular element at the point where it is submitted to heavy stresses due to the high pressure with which the annular margin of the free slidable disc-element is applied against its abutment.

According to another feature of my invention, said nut has a skirt extending beyond the threaded part thereof and fitting closely on the unthreaded part of the tubular element, thus reinforcing a part of the tubular element which otherwise would be unduly weakened. In an alternative embodiment, the annular abutment for the disc-shaped member is constituted by a ring of round section, hard wire, e. g., piano-wire housed in an annular groove provided in the inner wall of the terminal portion of the tube, around which external re-inforcing means are provided if required.

Other objects and advantages of the invention will be apparent from the following specification when taken with the accompanying drawings.

In these drawings:

Fig. 1 is an axial cross-section of a hydropneumatic accumulator having one head secured under gas pressure, according to the invention.

Fig. 2 shows an alternative embodiment of the annular abutment of said head.

Referring first to Fig. 1, there is shown at 8 a tubular container which constitutes the body of the accumulator and at A, a free piston assembly which constitutes, in the example shown, a gas tight movable partition for separating the two fluids in the accumulator body.

Head 12a is constituted by a disc-shaped member. On the periphery of the outer face of head 12a is provided an annular step in which is housed a ring 1a made of an elastic or plastic material, said ring bearing, on its inner side, against the cylindrical surface 7a of said step, on its outer side, against the inner wall of tube 8 and on one of its annular faces, against the bottom 5a of said step, while its free annular face bears on a metal washer 2b freely slidable with respect to head 12a and to the inner wall of tube 8. Once the head 12a, ring 1a and washer 2b have been introduced into the tubular body, a nut 12b is screwed on the threaded end of said body. Nut 12b offers an inner annular abutment 12c against which bears the metal washer 2b. When compressed gas is admitted into the cylinder, the head being previously held in normal closing position, the pressure of said gas acts upon the whole area of the inner face of head 12a, so that the latter is urged towards the abutment 12c. The contact pressure between the deformable ring 1a and the abutment 12c is, thus, equal to the internal gas pressure, multiplied by the ratio of the area of the inner surface of head 12a to the annular area of the abutment 12c, so that said contact pressure is very high compared with the internal gas pressure to thereby ensure a perfect gas tight seal.

To ensure tightness of port 14a through which gas is introduced into the accumulator, a patch 14b of a plastic material is provided on the inner face of head 12a, said patch being secured e. g. by means of simple splined nails 14c, so that when the accumulator is being inflated with gas, said patch is lifted from port 14a, while, on the contrary, when the accumulator is loaded, said patch is applied against said port under the pressure in the accumulator.

In the example shown, a screw 16 obturates the threaded bore which is provided to receive the male coupling member of a filling unit (not shown). In the example shown, the presence of said screw has been used to provide an additional tightness device, constituted by a ball 17 pressed by screw 16 on the flared outer end of the inflating port 14a.

In the example shown, the other head of the accumulator, i. e. that which is located on the liquid side, is constituted by a cap 11a screwed on the threaded end of body 8 and the tightness between said body and said cap is ensured by means of a simple pad 11b made of plastic or elastic material and disposed in a radial hole provided through cap 11a, pad 11b being applied under strong pressure against the threading of the body, said pressure being exerted by a threaded plug 11c screwed in said radial hole over the deformable pad 11b. It is clear that the liquid cannot escape out of the accumulator otherwise than along the threadings of the latter and cap 11a and that it is prevented from escaping therealong by the tightening action of plug 11b.

15 is an annular ridge projecting around the liquid side face of piston A. When tube 8 is empty of liquid, the gas pressure in the gas containing chamber of tube 8 forces ridge 15 of piston A against the inner face of cap 11a whereby this ridge, due to its very small area as compared with the area of the face of piston A subjected to the gas pressure, will ensure a high degree of gas tightness under the sole effect of the gas pressure itself.

It is to be noted that the cylindrical portion 19 of head 12a has a very small axial dimension, while the remaining portion of the disc is slightly conical, as indicated at 18. With this arrangement, head 12a is guided only along a negligible axial length, which permits avoiding any risk of gripping.

In the alternative embodiment shown in Fig. 2, the inner annular abutment against which is pressed head 12a is constituted by a piano wire 20 housed in an annular groove 21. In the example shown, a re-inforcing ring 22 has been moreover provided.

Finally, as shown at 23, a slight clearance space is provided between the inner end of the threading of cap 11a and nut 12b and the inner end of the corresponding threadings of tube 8, so as to permit said cap and said nut being screwed home on the end of said tube. Cap 11a and nut 12b are each provided with a skirt 24 extending beyond their threaded portions and fitting closely on an unthreaded part of tube 8 to reinforce the accumulator body there.

It is to be understood that I do not intend to limit my invention to the embodiment described and shown, nor otherwise than in the subjoined claims.

In particular, while I have shown, in Fig. 1, a free piston, gas tightness of which is ensured by a packing ring 1 acted upon by a spring 3, as described in the above cited application, my invention can be used in any hydropneumatic accumulator, whatever may be the manner in which the movable partition separating the two fluids is designed.

What is claimed is:

1. A hydropneumatic accumulator comprising a cylinder, a first closure member closing one end of said cylinder and a disc-shaped closure member movable in said cylinder for closing the other end thereof, a partition slidably mounted in said cylinder between said closure members to divide said cylinder into a liquid pressure chamber and a gas pressure chamber, said first closure member including means for connecting said liquid pressure chamber to a hydraulic system and said movable closure member including means permitting introduction of gas under pressure into said gas pressure chamber, an outwardly projecting axial extension bounded laterally by a cylindrical surface on said movable closure member, an annular packing element adapted to form a seal with the inner wall of said cylinder mounted on said extension, and abutment means mounted at said other cylinder end providing an annular inwardly facing contact surface for engagement by said packing element, whereby said movable closure member, when subjected to internal gas pressure, will define with said axial extension, with said inner cylindrical wall and with said contact surface an annular space enclosing said packing element and will apply said packing element against said contact surface with a pressure greater than said internal gas pressure to thereby form a gas-tight seal at said other cylinder end.

2. A hydropneumatic accumulator according to claim 1, in which said annular contact surface is provided in a nut and in which said cylinder has one threaded extremity adapted to receive said nut, whereby said nut reinforces said extremity.

3. A hydropneumatic accumulator according to claim 1 in which said abutment means is constituted by a piano wire housed in an annular groove provided in the inner wall of said cylinder.

4. A hydropneumatic accumulator according to claim 1, in which a metal ring forming an intermediate abutment of precise shape, dimensions and position, is interposed between said annular packing element and said annular contact surface.

5. A hydropneumatic accumulator according to claim 1, in which an annular ridge is provided on the face of said partition facing said liquid containing chamber, said annular ridge having a very small area as compared with the area of the other face of the partition subjected to gas pressure, whereby said ridge may be brought to bear against the liquid side head of the accumulator when the latter is empty of liquid, so as to ensure a high degree of gas tightness, for storage purposes, under the effect of the gas pressure itself.

References Cited in the file of this patent

UNITED STATES PATENTS

| | | |
|---|---|---|
| 912,502 | Squires | Feb. 16, 1909 |
| 2,195,292 | Albertson | Mar. 26, 1940 |
| 2,261,027 | Hopkins | Oct. 28, 1941 |
| 2,317,796 | Nielebock | Apr. 27, 1943 |
| 2,389,118 | Buehner | Nov. 20, 1945 |
| 2,401,791 | Overbeke | June 11, 1946 |
| 2,440,065 | Ashton | Apr. 20, 1948 |
| 2,537,241 | Smith | Jan. 9, 1951 |
| 2,662,663 | Schmidt et al. | Dec. 15, 1953 |

FOREIGN PATENTS

| | | |
|---|---|---|
| 429,749 | France | of 1911 |
| 1,003,657 | France | Nov. 21, 1951 |